United States Patent
Guyaguler et al.

(10) Patent No.: US 7,627,461 B2
(45) Date of Patent: Dec. 1, 2009

(54) METHOD FOR FIELD SCALE PRODUCTION OPTIMIZATION BY ENHANCING THE ALLOCATION OF WELL FLOW RATES

(75) Inventors: Baris Guyaguler, San Ramon, CA (US); Thomas James Byer, Sn Gabriel, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 408 days.

(21) Appl. No.: 10/854,379

(22) Filed: May 25, 2004

(65) Prior Publication Data

US 2005/0267718 A1 Dec. 1, 2005

(51) Int. Cl.
*G06G 7/57* (2006.01)
*G06G 7/50* (2006.01)
*G06G 7/48* (2006.01)
*G06Q 10/00* (2006.01)
*G05B 13/02* (2006.01)
*G05B 13/00* (2006.01)
*G05B 13/04* (2006.01)

(52) U.S. Cl. ............... 703/10; 703/9; 700/28; 700/29; 700/32; 700/33; 705/7

(58) Field of Classification Search ............ 703/9, 703/10; 700/28–29, 32–33; 705/7
See application file for complete search history.

(56) References Cited

U.S. PATENT DOCUMENTS

| | | | |
|---|---|---|---|
| 5,881,811 | A | 3/1999 | Lessi et al. |
| 6,101,447 | A | 8/2000 | Poe, Jr. |
| 6,234,250 | B1 | 5/2001 | Green et al. |
| 6,236,894 | B1 | 5/2001 | Stoisits et al. |
| 6,266,619 | B1 | 7/2001 | Thomas et al. |
| 6,356,844 | B2 | 3/2002 | Thomas et al. |
| 6,853,921 | B2* | 2/2005 | Thomas et al. ............... 702/14 |
| 6,980,940 | B1* | 12/2005 | Gurpinar et al. ............ 703/10 |
| 7,379,853 | B2* | 5/2008 | Middya ..................... 703/10 |
| 2002/0165671 | A1 | 11/2002 | Middya |
| 2002/0177955 | A1 | 11/2002 | Jalali et al. |

(Continued)

OTHER PUBLICATIONS

Yeten et al. "Optimization of Nonconventional Well Type, Location and Trajectory", Society of Petroleum Engineers, Sep. 29, 2002-Oct. 2, 2002, SPE 77565, pp. 1-14.*

(Continued)

Primary Examiner—Kamini S Shah
Assistant Examiner—Suzanne Lo
(74) Attorney, Agent, or Firm—Christopher D. Northcutt; Richard J. Schulte

(57) ABSTRACT

A method for enhancing the allocation of fluid flow rates among a plurality of well bores in fluid communication with at least one subterranean reservoir is disclosed. An objective function and system equations are generated which utilize constraint violation penalties associated with soft constraints. The soft constraints are constraints which may be violated if necessary to arrive at a feasible solution to optimizing the objective function and the system equations. The fluid flow rates are then allocated among the well bores as determined by the optimizing of the objective function and system equations. Fluid flow rates among well bores, particularly those exhibiting similar fluid characteristics, may be related to one another. Initial flow rates of components (oil, gas, and water) and pressures in the well bores may be determined by an initial simulation run. Then additional component flow rates may be estimated by scaling the original component flow rates based upon changing pressure draw downs in the well bores.

20 Claims, 9 Drawing Sheets

U.S. PATENT DOCUMENTS

2003/0225606 A1* 12/2003 Raghuraman et al. .......... 705/7
2005/0149307 A1* 7/2005 Gurpinar et al. .............. 703/10
2006/0085174 A1 4/2006 Hemanthkumar et al.

OTHER PUBLICATIONS

Fang et al. "A Generalized Well-Management Scheme for Reservoir Simulation", Society of Petroleum Engineers, SPE Reservoir Engineering, May 1996, pp. 116-120.*
Janoski et al. "Advanced Reservoir Simulation Using Soft Computing", Springer-Verlag, 2000, IEA/AIE 2000, LNAI 1821, pp. 623-628.*
Aronofsky et al. "The Use of Linear Programming and Mathematical Models in Underground Oil Production", Management Science, Jul. 1962, vol. 8, No. 4, 15 pages.*
Schlumberger, White paper "Reservoir and Production Optimization", Apr. 2002, 10 pages.*
Masoud Nikravesh, "Soft computing-based computational intelligent for reservoir characterization", Intelligent Computing in the Petroleum Industry, Jan. 2004, vol. 26, Iss. 1, 20 pages.*
Valvatne et al. "Semi-Analytical Modeling of the Performance of Intelligent Well Completions", SPE Reservoir Simulation Symposium, Feb. 11-14, 2001, SPE 66368, 10 pages.*
Yeten et al. "Optimization of Smart Well Control", SPE International Thermal Operations and Heavy Oil, Symposium Nov. 4-7, 2002, SPE 79031, 10 pages.*
Minkoff et al. "Coupled fluid flow and geomechanical deformation modeling", Journal of Petroleum Science and Engineering 38, 2003, pp. 37-56.*
Mohaghegh et al. "A Soft Computing-Based Method for the Identification of Best Practices, with Application in the Petroleum Industry", IEEE CIMSA, Jul. 20-22, 2005, pp. 232-237.*
Yang et al. "Modeling of Supercritical Fluid Extraction Using an Integrated Soft Computing and Conventional Approach" IEEE Int. Conf. on Robotics, Intelligent Systems and Signal Processing, Oct. 2003, pp. 668-673.*
Nikravesh et al. "Mining and fusion of petroleum data with fuzzy logic and neural network agents", Journal of Petroleum Science and Engineering 29, 2001, pp. 221-238.*
Qin et al. "A survey of industrial model predictive control technology", Control Engineering Practice, vol. 11, No. 7, Jul. 2003, 33 pages.*
Nikravesh et al. "Soft computing: tools for intelligent reservoir characterization (IRESC) and optimum well placement (OWP)", Journal of Petroleum Science and Engineering, vol. 29, 2001, pp. 239-262.*
Kosmidis et al. "Optimization of Well Oil Rate Allocations in Petroleum Fields" Ind. Eng. Chem. Res., Mar. 24, 2004, pp. 3513-3527.*
Trick, M.D., "A Different Approach to Coupling a Reservoir Simulator with a Surface Facilities Model", SPE 40001, 1998, Society of Petroleum Engineers, Inc., Gas Technology Symposium held in Calgary Alberta, Canada, Mar. 15-18, 1998, pp. 285-290.

Zhuang, X. and Zbu, J. "Parallelizing a Reservoir Simulator using MPI", XPOO2937117, The Institute of Electrical and Electronics Engineers, Inc., 1995, pp. 165-174.
Nikravesh, M., et al. "Nonlinear Control of an Oil Well", Proceedings of the American Control Conference, Albuquerque, New Mexico, Jun. 1997, pp. 739-743.
Hepguler, G.G., et al. "Applications of a Field Surface & Production Network Simulator Integrated with a Reservoir Simulator", Society of Petroleum Engineers, No. 38007 pp. 285-286, 1997.
Liu, W., et al. "Optimal Control of Steamflooding", Society of Petroleum Engineers, No. 21619, pp. 73-82, 1990.
Lyons, S.L. et al., "Integrated Management of Multiple Reservoir Field Development", Society of Petroleum Engineers, No. 29279 (Revised Manuscript), pp. 1075-1081, 1995.
Palke, M.R., et al., "Nonlinear Optimization of Well Production Considering Gas Lift and Phase Behavior", Society of Petroleum Engineers, No. 37428, pp. 341-356, 1997.
Zakirov. I.S., et al. "Optimizing Reservoir Performance by Automatic Allocation of Well Rates", Paper presented at the $5^{th}$ European Conference on the Mathematics of Oil Recovery, pp. 375-384, 1996.
Rardin, R.L., "Optimization in Operations Research" 1998, pp. 389-400.
Economides, M.J. et al, Petroleum Production Systems, Prentice-Hall, 1994, pp. 94-96.
Robert F. Heinemann et al. (Mobil Technology Company, Dallas, Texas), Next Generation Reservoir Optimization, Production/Reservoir Management, World Oil, Jan. 1998, pp. 47-54, 1998.
K. K. Lo et al., Use of Well Management Schemes for Rate Forecasts, SPE 24071, Society of Petroleum Engineers, pp. 425-433, 1992.
Lo, K.K., Starley, G.P., and Holden, C.W., Application of Linear Programming to Reservoir Development, Evaluations, *Society of Petroleum Engineers* (SPE 26637), 52-58, Feb. 1995.
Fang, W.Y., and Lo, K.K., A Generalized Well-Management Scheme for Reservoir Simulation, *Society of Petroleum Engineers* (SPE 29124), 116-120, May 1996.
Hepguler, G., Barua, S., and Bard, W., Integration of a Field Surface and Production Network With a Reservoir Simulator, *Society of Petroleum Engineers* (SPE 38937), 88-93, Jun. 1997.
Miertschin, J.W. and Weiser, A., A Flexible Approach to Predictive Well Management Via User-Defined Strategies, *Society of Petroleum Engineers* (SPE 19848), 817-826, 1989.
Beckner, B.L., Hutfilz, J.M., Ray, M.B., and Tomich, J.F., $EM^{power}$: New Reservoir Simulation System, *Society of Petroleum Engineers* (SPE 68116), 1-13, 2001.
Davidson, J.E. and Beckner, B.L., Integrated Optimization for Rate Allocation in Reservoir Simulation, *Society of Petroleum Engineers* (SPE 79701), 1-7, 2003.
L.J. Durlofsky, W.J. Milliken and A. Bernath, "Scale Up in the Near-Well Region," SPE 51940 1999, Department of Petroleum Engineering, Stanford U., Chevron Petroleum Technology Company.

* cited by examiner

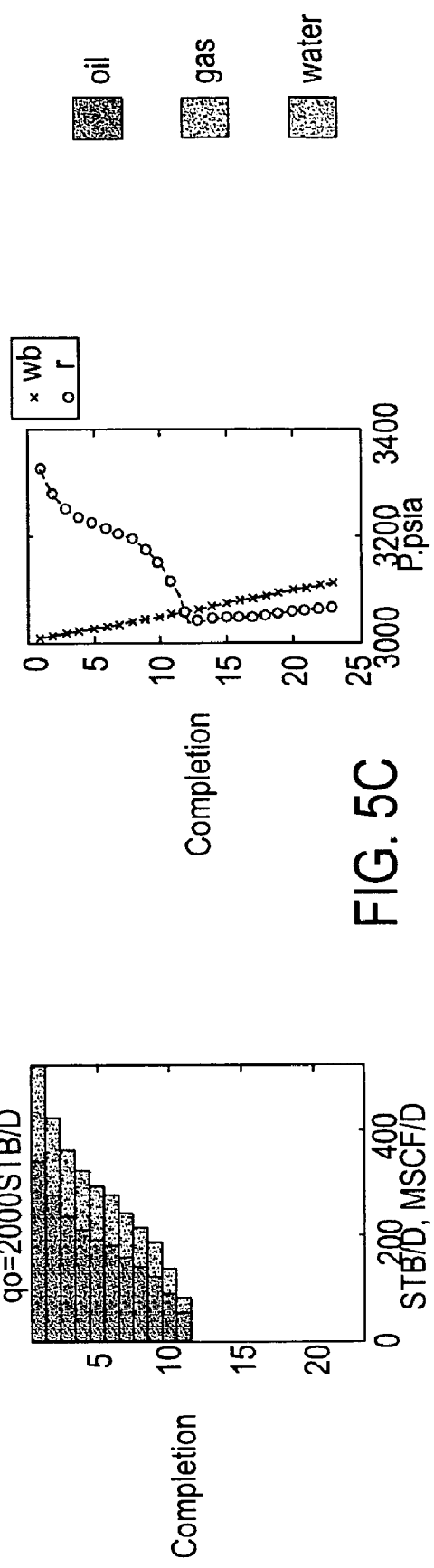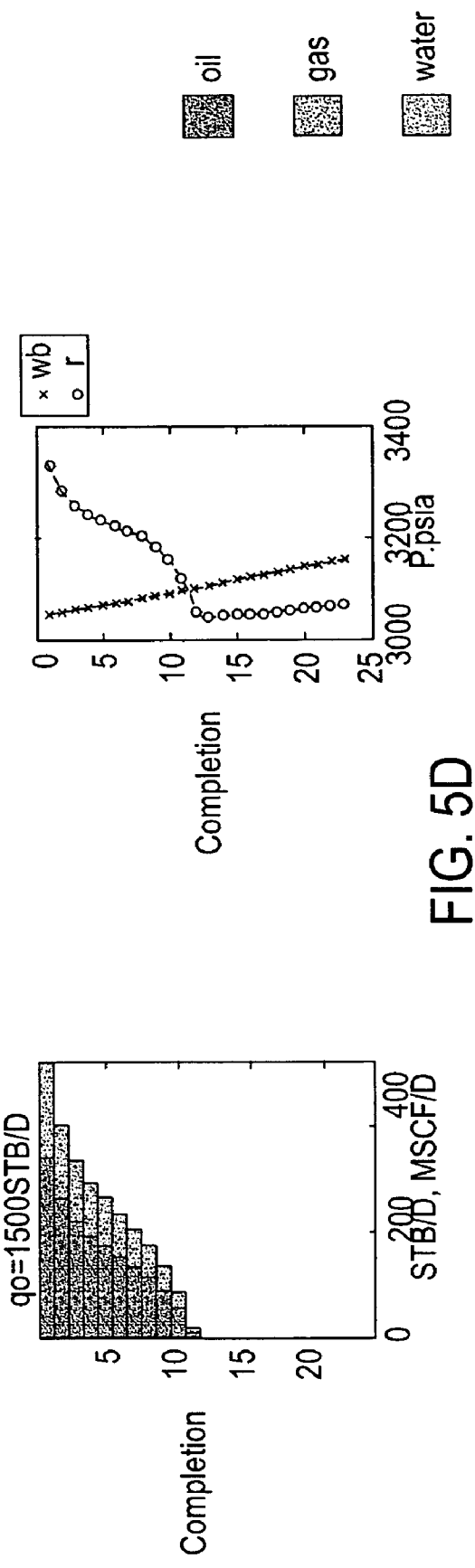
FIG. 5C
FIG. 5D $$y = a_{2k} + (x - a_{2k-1})\frac{a_{2k+2} - a_{2k}}{a_{2k+1} - a_{2k-1}}$$

$$y = a_{2k} + (x - a_{2k-1})\frac{a_{2k+2} - a_{2k}}{a_{2k+1} - a_{2k-1}} - P$$

METHOD FOR FIELD SCALE PRODUCTION OPTIMIZATION BY ENHANCING THE ALLOCATION OF WELL FLOW RATES

TECHNICAL FIELDS

The present invention relates generally to methods for controlling hydrocarbon production from a field of wells, and more particularly, to methods for optimizing production by enhancing fluid flow rate allocations among the wells.

BACKGROUND OF THE INVENTION

Field scale optimization is known which attempts to optimize or enhance the production of production fluids, including hydrocarbons, from a field containing one or more subterranean reservoirs. Wells or well bores connect the reservoirs with surface facilities which collect and process the captured production fluids. Typically, these production fluids include the components of oil, gas and water. Chokes or flow control devices are used to adjust the allocation of flow rates among the well bores in a field. The relative quantities and ratios of production of the different components of oil, gas and water for an individual well bore can be controlled by adjusting a choke to change the pressure in a well bore.

Surface facilities are needed to produce and process the production fluids. These facilities may include apparatus such as separators, pumps, storage tanks, compressors, etc. Ideally, the capital expenditures on these facilities are minimized by employing the smallest and least expensive surface facilities possible. However, fluid handling capacity should be sufficiently large so as not to unduly limit the production rate of the economically desirable oil and/or gas. Hence, the allocation of fluid flow in the well bores is ideally optimized to maximize monetary return while meeting production constraints such as those imposed by the fluid handling capacities of the surface facilities.

Optimization techniques are used predict the optimal allocation of fluid flows in well bores for a given set of production constraints. First, a reservoir simulator is used to mathematically model the flow of fluids throughout a field including the reservoirs and well bores. The simulated flow is used to establish component flow rate curves or rate equations for each well bore which describe how the flow rate of one component, such as water, relates to the flow rate of another component, i.e., oil. Typically, an objective function is created which seeks to optimize an objective such as maximizing oil production or minimizing water production. The objective function incorporates the flow rates from the well bores which are predicted by the reservoir simulation. A set of production constraints, such as oil production targets or gas or water production limitations for the field, are specified. Constraint equations are generated to meet these production constraints. The fluid flow among the well bores must adhere to these production constraints. The objective function is then optimized by a subroutine, referred to as an optimizer, to determine the optimal allocation of flow rates among the well bores. The optimizer utilizes the well bore component flow rate equations and constraint equations in the optimization process.

A first shortcoming of typical field scale optimization schemes is that feasible solutions to an optimization may not be possible for specified production constraints. For example, a certain level of oil production may be desired while not producing more than a specified quantity of water. A feasible solution to the objective function with this set of constraints may not be possible. In this event, one or more of the constraints must be adjusted and the reservoir simulator and optimizer run again to determine when a feasible solution is possible. Such iterative runs in solving numerous optimizations of the objective function are computationally intensive and undesirable.

A second problem in some optimization schemes is that while a feasible solution to the optimization of the objective function may be achieved, the results may not be practical. For example, in a first run or time step, the optimizer may determine that a first well bore should produce at a high level while a second well bore is substantially closed down. In the next time step, the optimizer may suggest that the second well bore produce at a high level while the first well bore is substantially shut down. Therefore, production from the well bores may oscillate if the suggested allocations from the optimizer are followed. Generally, it is more practical if the production from well bores having similar fluid flow characteristics are at a consistent level. This would minimize the oscillations in production from the related well bores over time steps.

A third shortcoming is that creating component flow rate curves or equations for the production of fluids from a well bore can be computationally intensive. One method of calculating these rate curves is to create a sub model of the well bores and surrounding reservoirs and iteratively solve for the production rates of the components, i.e., oil, gas and water, as the chokes are opened and the pressure draw downs between the reservoirs and the well bores are increased. Typically, several Newton iterations must be performed to produce each data point relating the production of one component relative to another component for a given pressure draw down in a well bore. Again, the pressure draw down in a well bore is related to how open is a choke controlling the well bore. This process is repeated many times until enough data points, perhaps as many as 30-50 data points, have been calculated such that an overall flow rate curve or equation can be developed. The optimizer then uses the rates curves or equations during the optimization of the objective function. Generating data points using these many Newton iterations to create rate curves or equations is computationally costly.

The present invention provides solutions to the above described shortcomings of conventional field scale optimization schemes. First, an objective function and associated constraint equations are generated which can be solved in a single run of an optimizer to produce a feasible solution. Second, constraint equations may be created which requires the rates of production from similar well bores to be related to prevent significant oscillation of well rates between time steps of a reservoir simulation. Finally, an efficient method of generating well bore component flow rate curves or equations relating production rates between fluid components of a well bore is described.

SUMMARY OF THE INVENTION

The present invention includes a method for enhancing the allocation of fluid flow rates among a plurality of well bores in fluid communication with at least one subterranean reservoir. Fluid flow is simulated, using a numerical reservoir simulator, in at least one subterranean reservoir and in a number of well bores in fluid communication with the subterranean reservoir. Component flow rate equations are generated from the simulated flow in the well bores. Production constraints are selected with at least one of the production constraints ideally being a soft constraint which may be violated if necessary during an optimization process to provide a feasible solution. Constraint equations corresponding to the production constraints are also generated.

An objective function is generated which corresponds to the fluid flow in the well bores. The objective function may also include constraint violation penalties which correspond to the soft constraints and soft constraint equations. The objective function is then optimized utilizing the component flow rate equations and the constraint equations to determine an enhanced allocation of fluid flow rates among the well bores. If necessary, soft constraints may be violated to achieve a feasible solution to the optimizing of the objective function. The presence of the constraint violation penalties allows the soft constraints to be violated while still satisfying a corresponding constraint equation. The fluid flow rates are then allocated among the well bores as determined by the optimizing of the objective function.

The soft constraints may be prioritized as to which of the soft constraints should be most difficult to violate if necessary to achieve a feasible solution to the optimization of the objective function. Weighting scale factors may be associated with the constraint violation penalties in the objective function.

The weighting scale factors may be weighted in accordance with the prioritization of the soft constraints to make higher priority soft constraints more difficult to violate than lower priority soft constraints.

Flow rates between select well bores may have their flow rates related. In particular, well bores exhibiting similar flow characteristics, such as gas-to-oil ratio (GOR) or water-to-oil ratio (WOR), may have their well rates related to one another. Again, constraint equations can be generated for these related well bore flow rates. The enhanced allocation of flow rates among the related well bores will then be related or tied to one another.

In another aspect of this invention, the simulated well bores include a plurality of completion elements and the reservoir or reservoirs include a plurality of reservoir elements. The reservoir simulator is run to determine pressures in the reservoir elements and in the completion elements and to determine fluid flows in the completion elements of at least two components, i.e., oil and water, due to the pressure draw down between the reservoir elements and the completion elements. Fluid flow component rate data points are then generated over a range of fluid flows for each well bore. The data points are ideally generated by scaling and summing the fluid flows in the completion elements based upon the component flow rates determined by an initial simulator run and in relation to an incremented range of pressure draw downs between the reservoir and completion elements.

It is an object of the present invention to provide a method wherein an objective function is created which includes at least one constraint violation penalty corresponding to a soft constraint which allows the objective function to be optimized wherein the soft constraint may be violated if necessary to arrive at a feasible solution for the optimization.

It is another object to generate an objective function which incorporates weighted constraint violation penalties which may be appropriately weighted so that soft constraints may be violated in a prioritized order.

It is yet another object to relate production rates of well bores in an optimization so that the flow rates among those well bores will have related flow rates after an optimization has been performed resulting in limited flow rate oscillations of those well bores between time steps in a reservoir simulation.

It is still another object to generate component flow rate equations which are generated by scaling component flow rates in individual completions elements based upon flow rates originally determined in a reservoir simulation run and a range of changing pressure profiles within the well bores.

BRIEF DESCRIPTION OF THE DRAWINGS

These and other objects, features and advantages of the present invention will become better understood with regard to the following description, pending claims and accompanying drawings where:

FIGS. 5A-D illustrate oil, gas and water production from individual completion elements of a well bore as the pressure profile in a well bore is allowed to increase due to the simulated closing of a well bore choke;

DETAILED DESCRIPTION OF THE INVENTION

A. Overview

Figure 1:
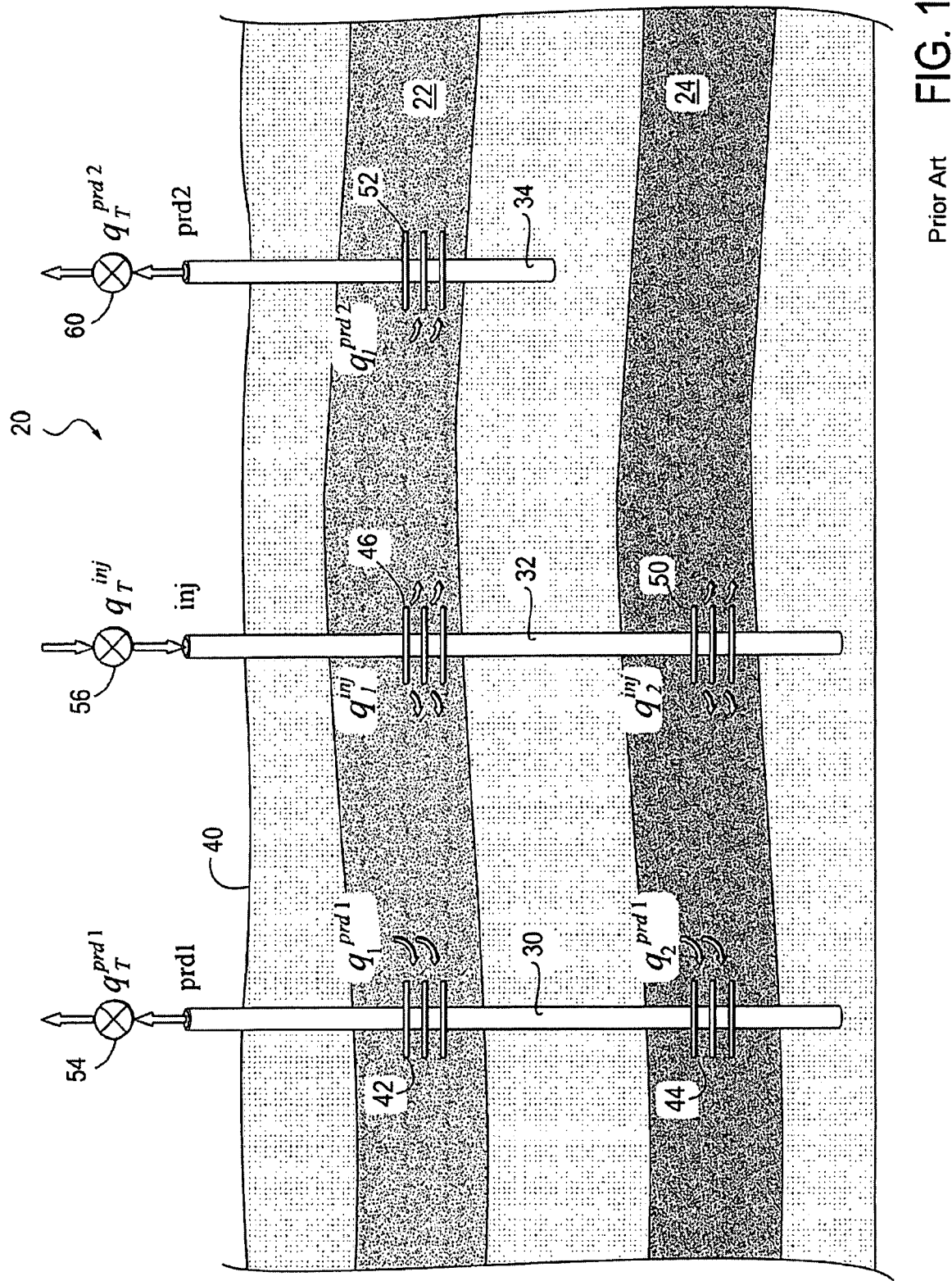
FIG. 1 is a schematic drawing of an exemplary hydrocarbon producing field containing subterranean reservoirs which are fluidly connected by well bores to the surface of the field with chokes being used to control well bore pressures and flow rates so that production from the field may be optimized.

FIG. 1 schematically illustrates an exemplary hydrocarbon producing field 20. Field 20 includes first upper and second lower reservoirs 22 and 24. Field 20 has a number of well bores 30, 32 and 34 which fluidly connect reservoirs 22 and 24 to the surface 40 of field 20. In this exemplary embodiment, well bores 30 and 34 are producing wells which provide production fluids containing components such as oil, gas and water. Well bore 32 is an injection well which may be used to inject water or other fluids for reservoir pressure maintenance or fluid disposal. Completions 42, 44, 46, 50, and 52 provide fluid communication between reservoirs 22 and 24 and well bore 30, 32 and 34. Well bore 34 only connects with upper reservoir 22.

Chokes or well control devices 54, 56, and 60 are used to control the flow of fluid into and out respective well bores 30, 32 and 34. As will be described more fully below, chokes 54, 56 and 60 also control the pressure profiles in respective well bores 30, 32 and 34. Although not shown, well bores 30, 32 and 34 will fluidly connect with surface facilities such as oil/gas/water separators, compressors, storage tanks, pumps, pipelines, etc. The rate of flow of fluids through well bores 30, 32 and 34 may be limited by the fluid handling capacities of these surface facilities.

Figure 2:
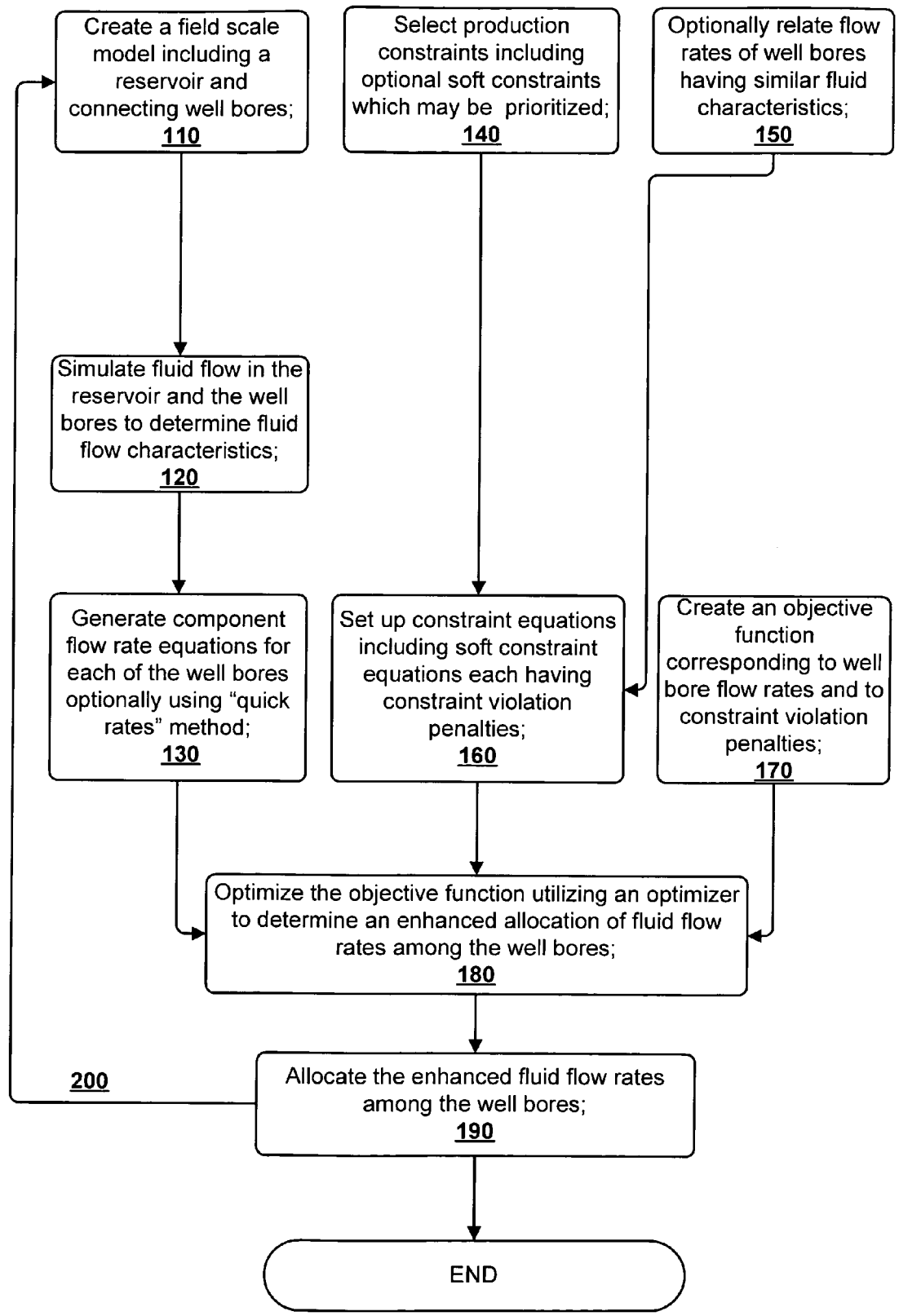
FIG. 2 is a flowchart of an exemplary method for field scale optimization made in accordance with this invention.

FIG. 2 shows a flowchart illustrating the general steps used in accordance with the field scale optimization method of the present invention. Persons skilled in the art of reservoir simulation could easily develop computer software for performing the method outlined in FIG. 2 based on the teachings contained in this description of the invention.

A reservoir simulator is used to model the fluid flow in field 50 which includes the reservoirs and well bores (step 110). Generally, such a reservoir model will include thousands or even millions of discrete elements to carry out a numerical simulation. These discrete elements comprise reservoir elements and well bore elements. The well bore elements include specific completion elements which transfer fluid back and forth between adjacent reservoir elements and other well bore elements which are in fluid communication with the choke and the surface facilities (not shown).

Initial and boundary conditions are specified on the field model. These initial and boundary conditions include, by way of example and not limitation, the initial pressures and flow rates in the reservoir elements and well bore elements, fluid compositions, viscosities, etc.

Next, a simulation run (step 120) is performed on the field model to calculate reservoir and fluid flow characteristics for a time step. In particular, fluid flow rates between the reservoirs and the well bores are determined as are the pressures in the reservoir and well bore elements. Producing well bores will receive producing fluids from the reservoirs, including oil, water and gas, which are delivered to the surface facilities of the field. Injection wells may be used to pressurize one or more of the reservoirs and/or to dispose of water. Also, gas may be injected into the well bores to provide gas assisted fluid production. Those skilled in the art will appreciate that many other operations affecting production may be modeled with a reservoir simulator and these operations are included within the scope of this invention.

Component fluid flow rates may be determined in terms of oil, gas and water flow. Alternatively, the fluid components for which flow is to be optimized could be compositional components such as light ($C_3$-$C_4$), medium ($C_5$-$C_8$) and heavy ($>C_9$) hydrocarbons. By way of example, and not limitation, other possible component combinations might include non-hydrocarbon components such as $H_2S$ and $CO_2$.

Component flow rate equations for each of the well bores are next calculated (step 130.) These component flow rate equations describe the estimated flow of one fluid component relative to that of another fluid component over the anticipated range of flow rates for a well bore. Physically, the chokes on the well bores may be opened or closed to increase or decrease the overall fluid output or input relative to a well bore. Because of changing pressure profiles in the well bores, the relative ratios of oil, gas and water produced from a well bore may change with the opening and closing of a choke.

Figure 3A:
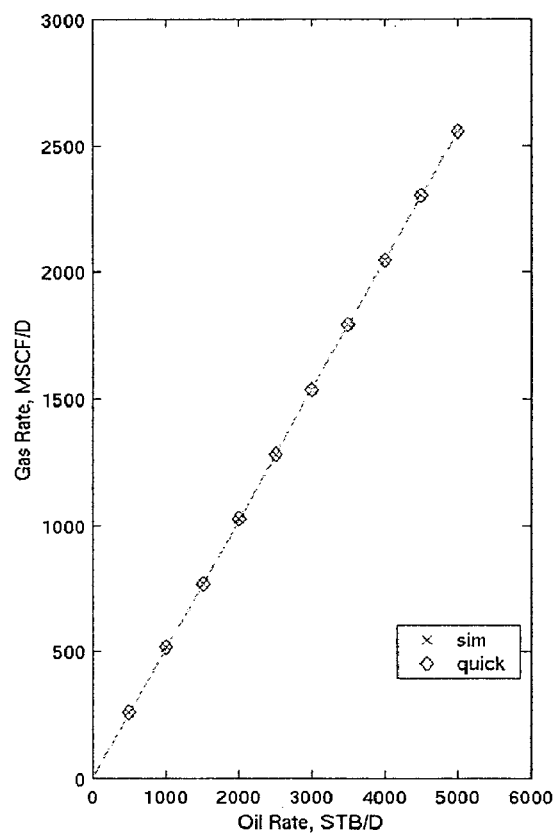
FIGS. 3A and 3B illustrate component flow rates curves generated using a "quick rates" method made in accordance with the present invention and component flow rate curves generated using a computationally intensive iterative Newton method.
Figure 3B:
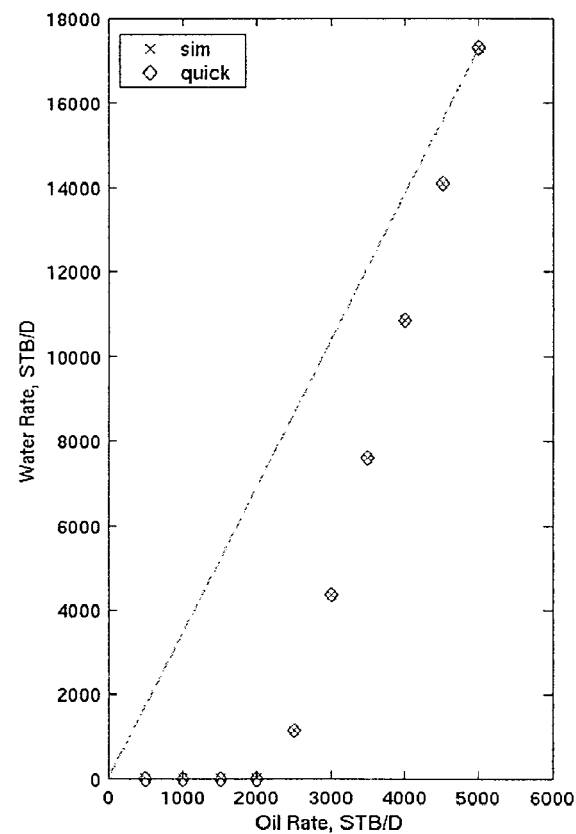

Examples of component flow rate curves for a well are shown in FIGS. 3A and 3B. In FIG. 3A, the rate of production of gas in MSCF/D (million square cubic feet per day) is plotted against the rate of production of oil in STB/D (stock tank barrels/day). In FIG. 3B, the rate of production of water (STB/D) is plotted against the rate of production of oil in STB/D. The rate of production of gas versus oil is relatively linearly over a wide range of possible oil production rates. However, the rate of water production is non-linear relative to the production rate of oil. Much more water is produced at higher outputs of oil production than at lower rates of oil production. High production outputs correspond to a wide open choke position.

In the preferred embodiment of this invention, a "quick-rates" method is used to generate individual component rate data points which can then be used to quickly construct graphs or generate component flow rate equations. More details on the "quick-rates" method will be described below. Those skilled in the art will appreciate that other methods may be used in generating estimates of how the production of one component versus the rate of production of another component may vary over the overall output range of a well bore.

A user will specify production constraints (step 140) to be used in conjunction with the field model. By way of example and not limitation, examples of production constraints include (1) producing oil at a target level; (2) producing gas at a target level; (3) limiting gas production below a predetermined limit; (4) limiting water production below a predetermined limit; (5) limiting water injection to an amount related to the water produced from the well bores; and (6) limiting gas injection above a predetermined limit to provide gas assisted lift. Further, these targets and limitations may be combined or scaled relative to one another as well.

The production constraints may include hard or soft constraints. Hard constraints are constraints which will not be allowed to be violated. Soft constraints are constraints which may be violated if necessary to produce a feasible solution to an optimization problem. Optionally, the order in which the soft constraints are preferably allowed to be violated, if necessary to achieve a feasible solution, may also be specified.

Another aspect of the present invention includes optionally specifying (step 150) whether the well bore flow rates of certain well bores are to be related. For example, well bores having similar fluid characteristics such as gas-to-oil ratio (GOR) or water-to-oil ratio (WOR), may be related to one another. The relating of production rates between well bores will insure that rates of production (or injection) between these well bores will not arbitrarily oscillate between time steps.

Constraint equations are then generated (step 160) from the production constraints and the related well bore rates. Hard constraint equations are created for those constraints which are not allowed to be violated. Soft constraint equations corresponding to the soft constraints are generated which include constraint violation penalties. The constraint violation penalties allow the soft constraint equations to be satisfied even when the soft constraints must be violated so that an optimization may produce a feasible solution. The generation of this set of constraint equations will be described in further detail below.

An objective function is created in step 170 which seeks to optimize an objective, such as oil production from field 50. The objective function ideally includes the component flow rates of the well bores and also the constraint violation penalties associated with the soft constraint equations. Weighting scale factors may be associated with the soft constraint penalties in the objective function. By appropriately weighting these weighting scale factors, the order in which related soft constraints may be violated, may be prioritized. The objective function is then optimized (step 180) by an optimizing subroutine (optimizer) to produce an optimized allocation of fluid flow rates among the well bores. The optimizer uses the component flow rate equations calculated in step 130 and the constraint equations set up in step 160 to optimize the objective function.

The optimized fluid flow rates, and other fluid flow characteristics determined from the optimizer such as constraint violation penalties, may then be allocated among the well bores and reservoir (step 190). These optimized flow rates and characteristics may then be imposed (step 200) as initial/boundary conditions in the next iterative time step in the reservoir simulation. Steps 120-200 are then repeated to provide enhanced field scale production over many time steps until a satisfactory period of time has elapsed and the simulation is then ended. More details on the above aforementioned steps will now be described.

B. Creation of the Objective Function and Constraint Equations

1. System of Constraint Equations

A linear programming (LP) system is a set of linear equations and linear constraints. A mixed integer programming (MIP) system is a set of linear or non-linear equations and constraints. In the present invention, preferably a MIP system augments a LP system when a set of non-linear equations or constraints, represented by piecewise linear functions, needs to be solved to achieve an optimized objective. An open source software package, which uses LP and MIP techniques, is used in this exemplary embodiment to optimize the objective function. In particular, the present invention uses a package entitled LP-Solve, which is available from http://packages.debian.org/stable/math/lp-solve. An alternative commercial solver is also utilized entitled XA which is available from Sunset Software Technology Corporation, of San Marino, Calif. Those skilled in the art will appreciate that other commercial LP/MIP optimizer packages may be used to optimize the objective function using fluid flow rates and constraint conditions.

The constraint equations, component flow rate equations, and the objective function are input into the optimizer. The optimizer then outputs a feasible solution to the optimization problem including enhanced allocation of well bore flow rates. Values for the violation of any soft constraints necessary to achieve a feasible solution to the optimization are also ideally output. A user may then make appropriate changes to production constraints or to the capacity of surface facilities to reflect the value of the violation of the soft constraints.

An extrema of an objective function is sought. A simple LP system may have the following form:

$$OBJ = \max\left\{\sum_i c_i x_i\right\} \text{ subject to constraints} \quad (1)$$

$$\text{in the form of: } \sum_i [a_i x_i - b_i]\{\leq, \geq, =\}0$$

where
i=index
$c_i$=weighing scale factor
$x_i$=parameters being optimized
$a_i$=multiplicative constant and;
$b_i$=additive constant In one embodiment of this invention, the main variables are well bore rates. That is, the rates at which components of fluid production, i.e., oil, water and gas, are produced from a well bore. Component flow rate equations are preferably generated using a "quick rates" method which will be described below. The component rate equations describe how much of one component is transported through a well bore as compared to another fluid component. The rates of production of the components may remain linear with respect to one another or may be non-linear over the potential range of well bore production outputs. The present invention ideally handles nonlinear scaling between component or phase rates through piecewise linear functions by formulating the system as a MIP problem. Production constraints are set up as hard constraints, which are not allowed to be violated, and/or as soft constraints, which are allowed to be violated when necessary to achieve a solution. The constraints may include target objectives and production limitations. The objective function is setup from information provided by a user.

2. Setting up the Objective Function

In general, the objective function comports with the mathematical expression:

$$OBJ = \sum_i w_i \sum_j q_{ij} - \sum_k w_k CVP_k \quad (2)$$

where
OBJ=objective to be optimized;
i=number of fluid components in a well bore fluid;
$w_i$=weighting scale factor for production of the $i^{th}$ fluid component in a well bore;
j=the number of well bores;
$q_{ij}$=quantity of the $i^{th}$ component produced by the $j^{th}$ well;
k=number of constraint violation penalties associated with the production constraints;
$w_k$=weighting scale factor for the $k^{th}$ constraint violation penalty; and
$CVP_k$=$k^{th}$ constraint violation penalty.

A more specific exemplary objective function for the LP/MIP system might consist of the weighted sum of total production rates of oil, water and gas for a selected set of well bores. In the present invention, the objective function may also include constraint violation penalty variables ($CVP_k$) to accommodate the use of soft constraints. A typical objective function may be expressed in the following mathematical form:

$$OBJ = w_o \sum_i q_{oi} + w_g \sum_i q_{gi} + w_w \sum_i q_{wi} - \sum_k w_k CVP_k \quad (3)$$

where
OBJ=objective to be optimized;
$w_o$=weighting scale factor for oil production;
$q_{oi}$=quantity of oil produced by the $i^{th}$ well;
$w_g$=weighting scale factor for gas production;
$q_{gi}$=quantity of gas produced by the $i^{th}$ well bore;
$w_w$=weighting scale factor for water production;
$q_{wi}$=quantity of water produced by the $i^{th}$ well bore;
$w_k$=weighting scale factor for the $k^{th}$; and
$CVP_k$=$k^{th}$ constraint violation penalty.

The weighting scale factors $w_i$ or well rate parameters may be specified by a user. For example, a user might specify:

$w_o$=1.0; $w_g$=−0.1; and $w_w$=−0.2.

These weighting scale factors correspond to the maximization of oil production rate while trying to minimize gas and water rates. In this case, the objective function is incremented by 1.0 for each stock tank barrel/day (STB/D) of oil produced ($w_{oil}$=1.0) and penalized by 0.2 for every million standard cubic feet/day (MSCF/D) of gas and 0.1 for every STB/D of water produced. In this case, the units of the objective function are a combination of STB/D and MSCF/D units. Normalization of the objective function components is ideally carried out to render the objective function non-dimensional.

Another preferred way of handling this unit mismatch in the objective function is to make use of economical information, if available. For example, if oil revenues are 22$/STB/D, gas revenues are 3$/MSCF/D and every STB/D of water costs $3.5 to handle, then:

$$w_o=22.0; w_g=3.0; \text{ and } w_w=-3.5.$$

In this case, the units of the objective function are monetary ($) and are consistent. It is preferred to scale the weighting scale factors so that $w_o$ is 1.0, hence the previous well rate parameter values would be normalized by 22.0 to give:

$$w_o=1.0; w_g=0.136; \text{ and } w_w=0.159.$$

3. Production Constraints

Constraints may be based on physical limitations such as well production limits, injection rate limits or gas lift rate limits. Alternatively, constraints may be determined to meet engineering preferences such as production/injection targets for a group of wells. Other constraints by way of example and not limitation might include Gas to Oil Ratios (GOR), Water to Oil Ratios (WOR), and constraints on a subset of wells or completions.

The LP/MIP system constraints are classified as hard and soft constraints. For example, hard constraints may be imposed on a pair of wells such that the combined maximum oil production is 5,000 STB/D. These hard constraints are translated into the following LP/MIP constraints:

$$q_{p=oil}^{w=PROD1} \leq 5,000 \tag{4}$$

$$q_{p=oil}^{w=PROD2} \leq 5,000$$

where $$q_{p=oil}^{w=PROD1}$$

=the quantity of oil produced from a first well; and $$q_{p=oil}^{w=PROD2}$$

=the quantity of oil produced from a second well.

4. Prioritization of Soft Constraints

Soft constraints are constraints that are allowed to be violated if-and-only-if there is no other way to honor the soft constraints while obtaining a feasible solution for the system. Ideally, this violation of constraints will be the minimum possible necessary for obtaining a solution. Constraint violations may occur when the system has conflicting limits/targets. Consider the following situation where the field has constraints including an oil production target and a water handling limit on a group of wells as follows:

Oil Production Target=7,500 STB/D

Water Production Limit >5,000 STB/D (5)

There might, and most probably, will be a point in the simulation where the group of wells will not be able to produce 7,500 STB/D of oil without producing more than 5,000 STB/D of water. Wells tend to produce more water as they age or mature. In such a case, the optimizer will not report a no-solution but instead will allow the violation of one of the soft constraints. Preferably, a flag will be raised indicating that the constraint has been violated. Which constraint is chosen to be violated first may be determined by the user as well in this preferred embodiment of this invention.

These oil target and water limit conditions are translated into the following three soft constraint equations:

$$\text{constraint-1: } q_{p=oil}^{w=PROD1} + q_{p=oil}^{w=PROD2} + CVP_1 \geq 7,500 \tag{6}$$

$$\text{constraint-2: } q_{p=oil}^{w=PROD1} + q_{p=oil}^{w=PROD2} - CVP_2 \leq 7,500$$

$$\text{constraint-3: } q_{p=water}^{w=PROD1} + q_{p=water}^{w=PROD2} - CVP_3 \leq 5,000$$

Constraint violation penalty $CVP_k$ variables are appended to the objective function:

$$OBJ = \ldots -w_1 CVP_1 - w_2 CVP_2 - w_3 CVP_3 \tag{7}$$

subject to:
$w_k>0$ where $w_k$ is the $k^{th}$ weighting scale factor associated with the $k^{th}$ constraint violation penalty; and
$CVP_k>0$ where $CVP_k$ is the $k^{th}$ constraint violation penalty which is associated with the $k^{th}$ constraint equation.

Note that this setup forces the CVP variables to be zero since they have negative weights in the objective function which makes them equivalent to hard constraints whenever they can be met, i.e., when oil production is equal to 7,500 STB/D and water production is less then 5,000 STB/D.

Suppose the reservoir conditions are such that in order to produce 7,500 STB/D of oil, 5,100 STB/D of water has to be produced. In this case, there are two options:

scale back production and meet the water limit but disregard the oil target; or meet the oil target but produce more water than the water limit.

Whether the LP/MIP system chooses to scale back production or meet the water limit depends on the coefficients or weighting scale factors $w_k$ of the $CVP_k$ variables. Suppose the water capacity limit is absolute and that the oil production is allowed to be scaled back to meet the water limit. In this case, suppose $w_1=1$, $w_2=1$ and $w_3=2$ which corresponds to constraint-3 (water production limit) having more priority than the other two constraints (oil production target). Note that the weighting scale factor $w_3$ is given greater weight than the other two weighting scale factors $w_1$ and $w_2$ associated with the oil production. When the well rates are scaled back to meet the water production limit, suppose the oil production drops to 7,400 STB/D when water production is exactly 5,000 STB/D. In this case, $CVP_1$ will have to be non-zero to satisfy constraint 1, to be exactly $CVP_1=100$. In this setting, the LP/MIP system will choose to scale back the rates rather than produce more water due to the specific values of CVP coefficients $w_k$. The objective function entries will appear as follows for these two cases.

If the oil production target is disregarded and oil production is allowed to be scaled back to meet the water limit, then:

$$q_{p=oil}^{w=PROD1} + q_{p=oil}^{w=PROD2} = 7,400 \tag{8}$$

$$q_{p=water}^{w=PROD1} + q_{p=water}^{w=PROD2} = 5,000$$

$CVF_1=100 \; CVF_2=0 \; CVF_3=0$ $$OBJ = \ldots -1CVF_1 - 1CVF_2 - 2CVF_3 = \ldots -100 \tag{9}$$

If the oil production target is enforced but the limit on the water production limit is allowed to be violated, then:

$$q_{p=oil}^{w=PROD1} + q_{p=oil}^{w=PROD2} = 7,500 \quad (10)$$

$$q_{p=water}^{w=PROD1} + q_{p=water}^{w=PROD2} = 5,100$$

$$CVF_1 = 0 \, CVF_2 = 0 \, CVF_3 = 100$$

$$OBJ = \ldots -1CVF_1 - 1CVF_2 - 2CVF_3 = \ldots -200 \quad (11)$$

Since, everything else being the same, scaling back rates results in a higher objective function value (+100), the LP/MIP optimizer will prefer to scale back the rates. The same approach may be used to handle n soft constraints and put them in a desired priority order of violation.

If the order in which the soft constraints are to be violated is not specified and remains unprioritized, then all of the weighting scale factors $w_k$ are equal and no preference is given as to which constraint is allowed to be violated first. In this event, $w_1 = w_2 = w_3 = 1$. Alternatively, a first soft constraint may be given the lowest priority, a second soft constraint is given a slightly higher priority, and a third soft constraint is given the highest priority. In this exemplary embodiment of the invention, the weighting scale factors $w_i$ are then given values corresponding to $10 \times 10^P$ where p is order of priority in which the soft constraints may be violated. For example, $$w_1 = 10 \times 10^1; \ w_2 = 10 \times 10^2; \ \text{and} \ w_3 = 10 \times 10^3$$

The general equation for the objection function is:

$$OBJ = \ldots -w_1 CVP_1 - w_2 CVP_2 - w_3 CVP_3 \quad (12)$$

The objective function with weighting scale factors then becomes:

$$OBJ = \ldots -10 \times 10^1 CVF_1 - 10 \times 10^2 CVF_2 - 10 \times 10^3 CVF_3 \quad (13)$$

Preferably, these coefficients are normalized to give values of between 0 and 1. The normalization is partially based upon the potential range of a constraint violation penalty.

Constraint1 $0 <= CVP_{normi} <= 1$ $$CVP_{normi} = (CVP - CVP_{min})/(CVP_{max} - CVP_{min}) \quad (14)$$

Or, since $CVP_{min}$ is always zero:

$$w_i = 10 \times 10^P/(CVP_{maxi}) \quad (15)$$

$CVP_k$ parameters are optimized along with the other parameters in the optimization system (production/injection rates). Since any positive value of $CVP_k$ imposes a penalty through the objective function, the system tries to keep $CVP_k$ values as zero. $CVP_k$ gains a positive value if and only if there is no other way to achieve a feasible solution.

Note that if there are no conflicting objectives for optimization, all of the CVP variables will be zero and soft constraints will be equivalent to hard constraints.

The operators used with the soft constraints are translated into LP/MIP equations as follows:

| op | Soft constraint criteria | | op | LP/MIP equation |
|---|---|---|---|---|
| > | WATPR > 5,000 | becomes | ≦ | $q_w \leq 5,000$ |
| < | GASPR < 10,000 | becomes | ≧ | $q_g \geq 5,000$ |
| = | OILPR = 7,500 | becomes | ≦ and ≧ | $q_o \leq 7,500$ and $q_o \geq 7,500$ |

Note that the (=) operator is the target operator and would satisfy a condition (thus trigger an action) if the criteria left-hand-side is not equal to the criteria right-hand-side.

5. Relating Well Rates

LP/MIP systems are strictly mathematical and thus have no notion of the physics underlying the variables, equations and constraints. Therefore, in some cases, the LP/MIP results, although mathematically sound, may make little practical sense. Such a case may occur when the LP/MIP optimizer decides to significantly choke back only one well bore in a group of well bores that all have insignificant differences in their properties. This might result in large rate oscillations for individual wells between time steps. To prevent such an occurrence, the present invention provides the option that well rates of well bores with close characteristics be related.

If it is determined that the well rates should be related, in addition to the existing constraint equations, further constraints equations that relate certain well bore flow rates are setup. For example, if well bores which have fluid characteristics which are within a predetermined range of one another, such as gas-to-oil ratios (GOR) and/or water-to-oil ratios (WOR), then the flow rates of these well bores may be related. Similar to the soft constraint equations described above, these rate relating equation may have weighting scale factors which are close to one another and include constraint violation penalties.

Figure 4A:
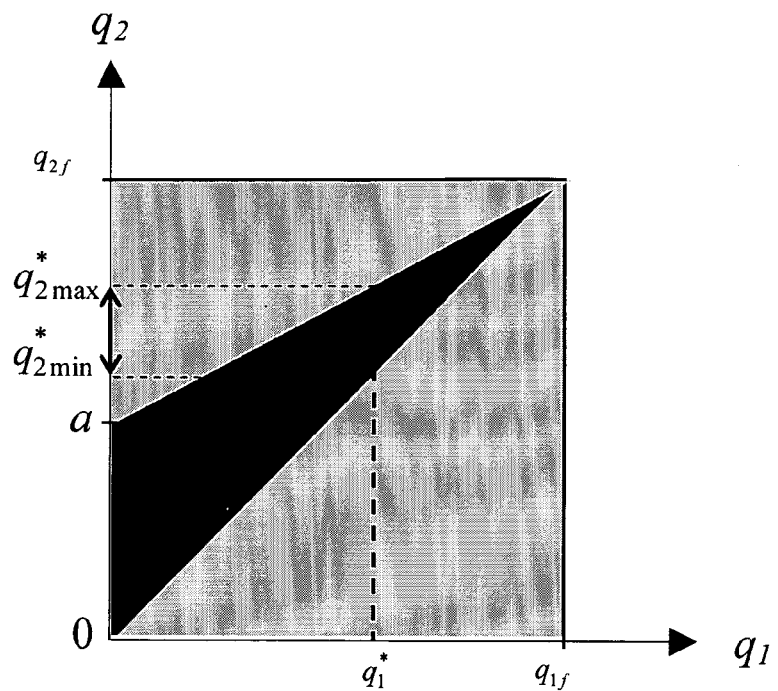
FIGS. 4A and 4B are graphs showing how well rates are related between a pair of well bores having similar fluid characteristics.

Referring now to FIG. 4A, for instance, given the flow rate of a well bore with the maximum GOR ($q_1$), the flow rate of the related well ($q_2$) is allowed to be in the shaded area. This is achieved by adding the following constraints to the system:

$$q_2 - \frac{q_{2f}}{q_{1f}} \cdot q_1 - a - RVP \leq 0 \quad (16)$$

$$q_2 - \frac{q_{2f}}{q_{1f}} \cdot q_1 - RVP \geq 0$$

where
$q_1, q_2$ = rates that are being related to one another
$q_{1f}, q_{2f}$ = maximum possible value of rates
RVP = Rate Violation Penalty
α = value determining "strictness" of relation all RVPs are added to the objective function with a negative weight:

$$OBJ = \ldots - \sum_i w_i RVP_i \quad (17)$$

where $w_1$ is chosen to be −10 in this particular example.
α is given by:

$$a = f\left(\frac{GOR_1 - GOR_2}{GOR_1}\right) q_{2f} \quad (18)$$

Figure 4B:
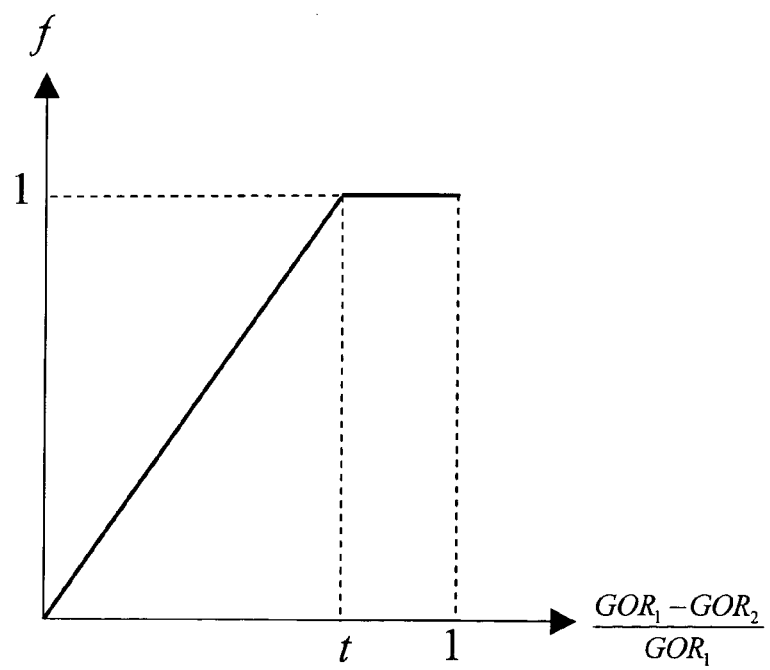
Figures 5A, 5B:
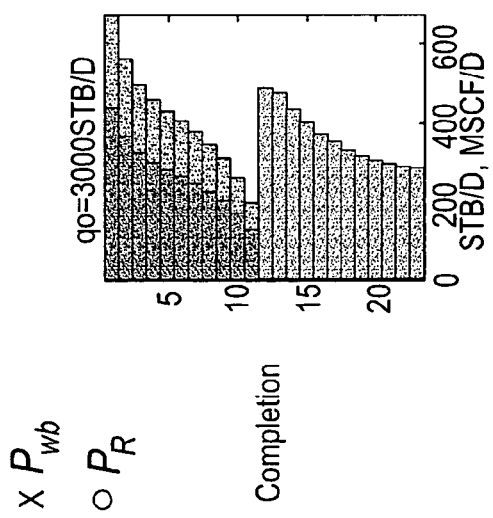

This means that when $q_1=q_1^*$, $q_2$ needs to be in the range $\lfloor q_2^*{}_{min}, q_2^*{}_{max} \rfloor$. The function $f$ is a simple linear function as shown in FIG. 4B.

The present invention allows a user to change a threshold value t, however, t=1.0 should work for most cases. With this setting, given t=1.0, a well with $GOR_2=0.0$ will not be related, and will have an independent rate scaling factor, whereas on the other extreme when $GOR_2=GOR_1$, the shaded area in FIG. 4A will collapse into a line as shown in FIG. 4B and the second well bore will be forced to have the same scaling factor as well bore 1.

Another way to relate flow rates is through scaling flow rates in a group of well bores by the same factor. For example, the injection rates of all the injectors in a first injector well group and the production rates of all the producers in a first production group of well bores may be related. This relation is not based on GOR or WOR in this case; the relation simply implies that when the rate of a well bore is scaled by a factor, the other wells in the related group will be scaled with the same factor.

For instance, if a well bore in a first production group needs to cut production by half (to satisfy another constraint perhaps), then all the well bores in a first production group will cut production by half. Ideally, the default for this relation is to have less weight in the LP/MIP system than the specified constraints. This means that rate-relations may be broken for the sake of satisfying the constraints. Parameters can be used to determine the relative weights of the constraints and rate-relations in the LP/MIP system. The smaller (more negative) these coefficients, the more influence these coefficients will have on the system.

C. Generation of Rate Curves and Component Flow Rate Equations

1. Quick Rates Method

The following "quick rates" method is preferably used in generating fluid flow component flow rate curves and equations. A rate curve relates how the production of one component compares with the production of another. For example, as a choke or valve is opened on a well, oil, water and gas production will generally increase. The increase between any two of the components may be linear or non-linear over the range of overall fluid production. Referring again to FIGS. 3A and 3B, gas and oil production are shown to be generally linear while water and oil production are generally non-linear. The rate curves are generated from a series of data points. Data points generated using an iterative Newton-Raphson procedure in conjuction with a sub-portion of the reservoir model are indicated by "x" marks. Data points indicated by "diamond" indicia were created using a "quick rates" method. Note that both methods provide similar results. However, the "quick rates" method is much more computationally efficient.

The quick-rates method utilizes the fact that at a fixed point in time, production from individual completion elements is generally linearly proportional to pressure draw down. Pressure draw down is the pressure differential between the pressure in a well bore completion element and adjacent reservoir elements. It is this pressure differential which drives fluids into and out of the completion elements during respective production and injection operations. Using a number of different pressure draw down profiles for each well bore, a set of data points is generated. Then, a piecewise linear function that best fits these points is ideally constructed. A component flow rate equation is then generated from this piecewise linear function which is to be used by the optimizer.

The oil-water total component flow rate curve is piecewise linear, which is not a linear function. FIGS. 5A-D show the flow rates of individual completion elements for four different overall production outputs for a well bore. Also shown are the pressure profiles for the reservoir and well bore elements for these different production rates. FIGS. 5A-D illustrate cases where oil production is being sequentially reduced, such as occurs when a well head choke valve of a well bore is being closed. Note as oil production is reduced, water production is reduced until almost no water is produced.

While the rate of production is decreased, the well bore pressure profile of the well bore will increase. The pressure profile of the reservoir is assumed to remain constant at a given time step. This will result in the pressure draw down in the well decreasing as the well bore pressure profile increases toward the reservoir pressure profile. Note that the pressure at deeper completions will be greater than at shallower depth completions due to pressure head/gravity effects. Consequently, pressure draw down will be lower at greater depths where denser water underlies less dense layers of oil and gas.

The present invention exploits the linear rate scaling for individual well bore completions. The total production rate of component p, i.e., oil, water or gas, from a well is the sum of rates from its flowing completions:

$$q_{pT} = \sum_{i=1}^{n_{comp}} q_{pi} \tag{19}$$

where
$q_{pT}$=total quantity of flow from a well;
$n_{comp}$=number of completion elements s in a well; and
$q_{pi}$=quantity of flow of a component from the $i^{th}$ well bore.

The baseline flow rate of each component at each individual completion is extracted from the reservoir simulation run at a particular time step and well production level. It is assumed that at a fixed point in time the completion rate for each individual well completion element is linearly proportional to the pressure draw down. Thus, if the pressure draw down in a well is reduced by an amount, c, individual completion rates will be scaled back accordingly and the new total rate will be given by:

$$q_{pT}^* = \sum_{i=1}^{n_{comp}} \frac{\Delta P_i - c}{\Delta P_i} q_{pi} \tag{20}$$

where
$q_{pT}^*$ =new total quantity of flow from a well;
c=reduction in pressure draw down;
$n_{comp}$=number of completion elements in a well;
$\Delta P_i$=original pressure draw down in the $i^{th}$ completion element; and
$q_{pi}$=quantity of flow of a phase from the $i^{th}$ well bore;

Thus, the amount of pressure shift, c, required to reduce the well oil rate from q to q * is given by:

$$c = \frac{q_{oT} - q_{oT}^*}{\sum_{i=1}^{n_{comp}} \frac{q_{oi}}{\Delta P_i}} \tag{21}$$

Figure 6:
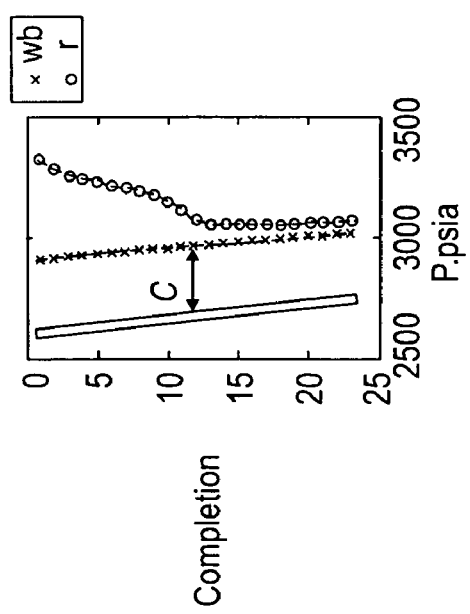
FIG. 6 illustrates that well bore pressure profiles are allowed to change by a pressure change "c" while the pressure profile in an adjacent reservoir remains static during a calculation used to generate component flow rate curves for a well bore.

This pressure shift dictates a parallel shift in the well bore pressure profile, as illustrated in FIG. 6. Having calculated c, equation 20 can be used to calculate the well rates of other components flowing in the well bore. The same procedure can be used for injection rates as well. Repeating this process, a number of component flow data points may be generated and a curve may be generated as has been considered previously with respect to FIGS. 3A and 3B.

2. Piecewise Linear Function Construction

Piecewise linear functions are generated which best represent these data point sets generated by the "quick-rates" method for each of the well bores. The piecewise linear functions include a number of line segments and breakpoints. The number and location of the breakpoints are ideally selected using a least squares fit to the data set generated by the "quick-rates" method. In this exemplary embodiment, a Levenberg-Marquardt least squares fit method is preferably used to locate breakpoints. Those skilled in the art will appreciate other curve or equation generating techniques may be used to represent the generated data points which is to be used by the optimizer.

Figure 7A:
FIGS. 7A and 7B illustrate a respective line segment and a pair of line segments which are used to construct a piecewise linear function.
Figure 7B:
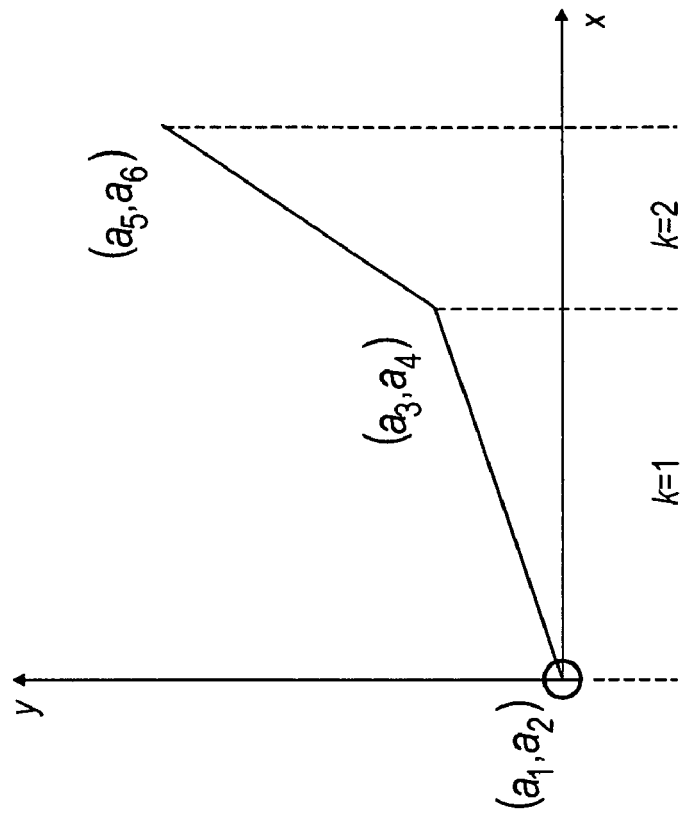

Referring now to FIGS. 7A and 7B, given a segment k, the coordinates of the end points of the segment is given by:

$$(\alpha_{2k-1}, \alpha_{2k}) \text{ and } (\alpha_{2k+1}, \alpha_{2k+2}) \quad (22)$$

Least square methods, such as the Levenberg-Marquardt, require the derivatives of this function, y, be determined with respect to the parameters, $\alpha$. These derivatives are:

$$\frac{\partial y}{\partial a_{2k-1}} = (a_{2k+2} - a_{2k}) \frac{-a_{2k+1} + x}{(a_{2k+1} - a_{2k-1})^2} \quad (23)$$

$$\frac{\partial y}{\partial a_{2k}} = 1 - \frac{x - a_{2k-1}}{a_{2k+1} - a_{2k-1}}$$

$$\frac{\partial y}{\partial a_{2k-1}} = -\frac{(x - a_{2k-1})(a_{2k+2} - a_{2k})}{(a_{2k+1} - a_{2k-1})^2}$$

$$\frac{\partial y}{\partial a_{2k+1}} = \frac{x - a_{2k-1}}{a_{2k+1} - a_{2k-1}}$$

Figure 8:
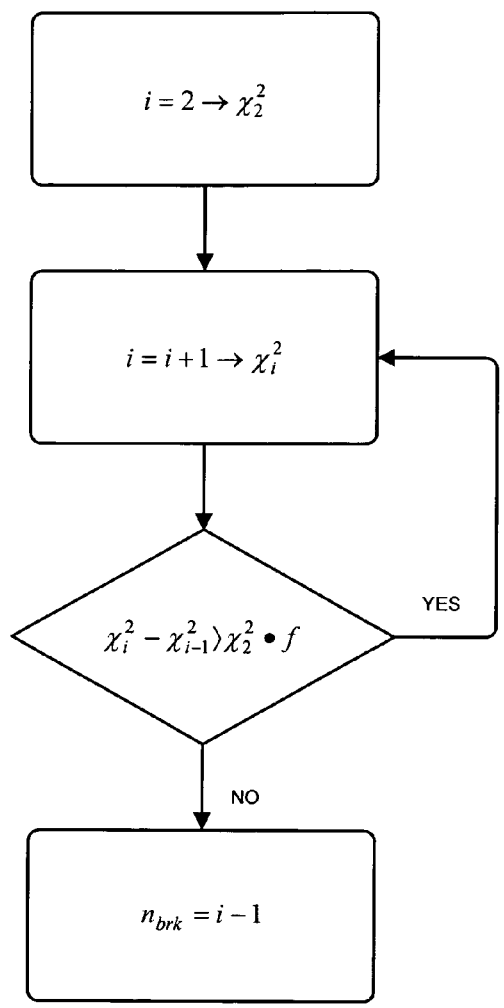
FIG. 8 shows a flowchart for a method of selecting an optimal number of breakpoints in creating a piecewise linear function.

In the preferred embodiment, ideally an appropriate number of breakpoints as well as their optimum locations are determined. The algorithm shown in FIG. 8 is used for the selection of the number of breakpoints.

The first step is to start with a linear function (i.e. a single segment, two end points, hence i=2. The $102_i^2$ for this linear function is calculated ($\chi_2^2$). Then a break point is added to the linear function making it a piecewise linear function with two segments and three end points (i=i+1, i.e., i=3). The breakpoint coordinates is optimized for minimum $\chi_i^2$. If the fit is improved by more than a factor of f from the initial fit, then a new breakpoint is added and the process is repeated until the improvement is not significant. This algorithm keeps adding more breakpoints only if this improves the fit by the fraction f.

Figure 9:
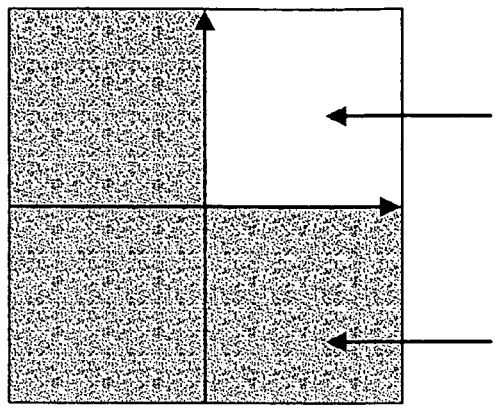
FIG. 9 depicts a graph showing that breakpoints should fall within a first quadrant in order to prevent negative rates.

A better fit can be made by decreasing the value of f at the expense of having a larger number of segments. This approach is generally robust. A check may be made to make sure that the breakpoints are always in the feasible region (first quadrant). This is ensured by penalizing (P) the solutions that fall into infeasible areas, as shown in FIG. 9.

3. Incorporation of Piecewise Linear Functions Into the Linear Programming

Incorporation of piecewise linear curve to the LP setup requires the introduction of binaries, additional continuous parameters and some constraints. Following is the set of equations and variables that need to be added:

Break points:

$$(x_{bi}, y_{bi}) \ i=1, 2, \ldots, n \quad (24)$$

Replace rate term with:

$$q = z_1 y_{b1} + z_2 y_{b2} + \ldots + z_n y_{bn}$$

Add constraints:

$$z_1 \leq y_1 \ z_2 \leq y_1 + y_2 \ z_3 \leq y_2 + y_3 \ldots z_{n-1} \leq y_{n-2} + y_{n-1}$$
$$z_n \leq y_{n-1}$$

$$y_1 + y_2 + \ldots + y_{n-1} 1 = 1$$

$$z_1 + z_2 + \ldots + z_n = 1$$

$$q_1 = z_1 x_{b1} + z_2 x_{b2} + \ldots + z_n x_{bn}$$

$$y_i \in \{0,1\} \ i=1, 2, \ldots, n-1$$

$$z_i \geq 0 \ i=1, 2, \ldots, n \quad (25)$$

Figure 10:
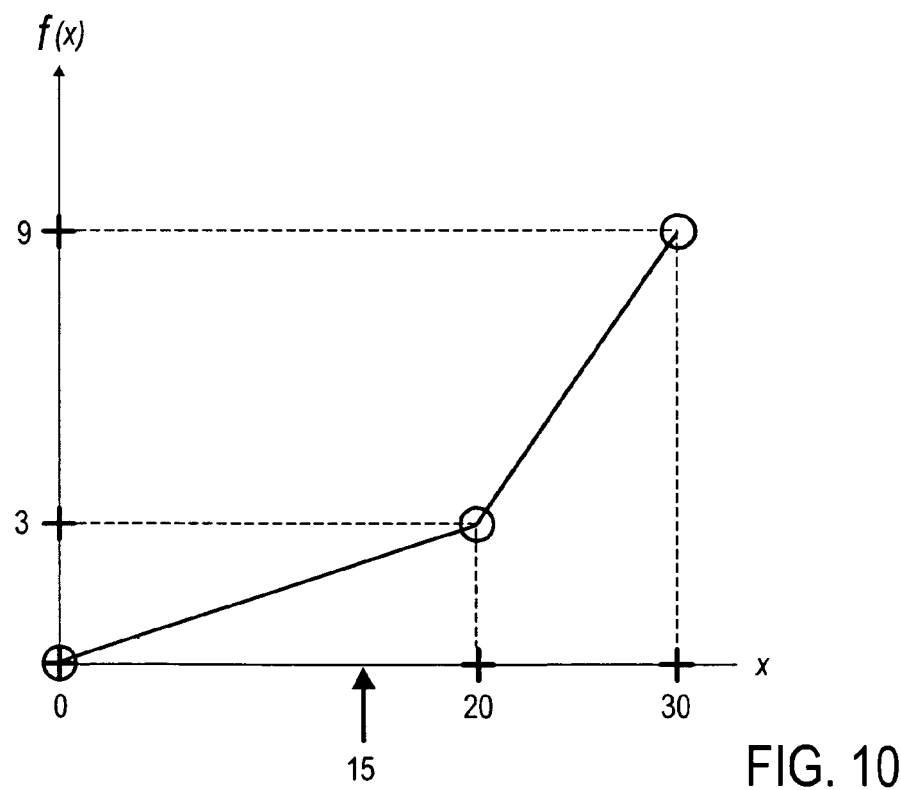
FIG. 10 illustrates a piecewise linear function.

Here, q is the dependent rate and $q_1$ is the controlling rate. Now it will be demonstrated why such a setup results in the correct behavior with a simple piecewise linear function with the two segments. Suppose the function appears as in FIG. 10. The value for the function at x=15 is to be determined. The formulation corresponding to this problem would be:

$$f(x) = z_1 0 + z_2 3 + z_3 9$$

$$x = z_1 0 + z_2 20 + z_3 30$$

$$z_1 \leq y_1 \ z_2 \leq y_1 + y_2 \ z_3 \leq y_2$$

$$y_1 + y_2 = 1$$

$$z_1 + z_2 + z_3 = 1$$

$$y_i \in \{0,1\} \ i=1, 2$$

$$z_i > 0 \ i=1, 2, 3 \quad (26)$$

The binary y indicates the segment that x belongs to. In this case, $y_1$ should be one and $y_2$ should be zero. First, check to see if $y_2$ can ever be one. If $y_2$ was one, then $y_1$ has to be zero, which means $z_1$ is zero and $z_2$ and $z_3$ are non-zero. However, if $z_2$ and $z_3$ are non-zero, x=15 for the second equation can never be satisfied, thus $y_2$ cannot be 1. Thus if $y_1$ is one, then solving for z obtains:

$$z_1 = 0.25$$

$$f(x) = 2.25.$$

$$z_2 = 0.75$$

Incorporation of the equations and variables in equation 24 force the LP/MIP optimizer to honor the component flow rate curves.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for enhancing the allocation of fluid flow rates among a plurality of well bores in fluid communication with at least one subterranean reservoir, the method comprising:
   (a) simulating fluid flow of a fluid containing multiple components in at least one subterranean reservoir and in a plurality of well bores which are in fluid communication with the at least one subterranean reservoir;

(b) selecting production constraints including at least one hard constraint wherein the at least one hard constraint is observed and at least one soft constraint wherein the at least one soft constraint may be violated;

(c) generating system equations including component flow rate equations corresponding to the simulated fluid flow in the well bores including comparing characteristics of fluid flow in at least two well bores and if the characteristics are within a predetermined range of one another, then relating the fluid flow rates of the at least two well bores together by generating rate relating equations in the system equations so that the at least two well bores will have related allocated flow rates and constraint equations including at least one soft constraint equation associated with the at least one soft constraint, the at least one soft constraint equation including a constraint violation penalty (CVP) which allows the at least on soft constraint equation to satisfy the soft constraint;

(d) generating an objective function corresponding to the fluid flow in the well bores and to the constraint violation penalty;

(e) optimizing the objective function utilizing an optimizer and the system equations to determine an enhanced allocation of fluid flow rates among the plurality of well bores wherein the at least one soft constraint may be violated if necessary to achieve a physically deployable solution to the optimization and violating the at least one hard constraint causes the optimization to be physically non-deployable; and (f) allocating the fluid flow rates among the plurality of well bores as determined in step (e) by adjusting well control devices to control fluid flow in the plurality of well bores.

2. The method of claim 1 wherein:
the production constraints include a plurality of soft constraints which may be violated;
the system equations include a plurality of soft constraint equations corresponding to the soft constraints, each of the soft constraint equations including a respective constraint violation penalty (CVP) which allows that soft constraint equation to satisfy the respective soft constraint; and
the objective function corresponds to the fluid flow in the well bores and to the constraint violation penalties;
wherein the soft constraints may be violated if necessary to achieve a physically deployable solution to the optimization.

3. The method of claim 2 wherein:
the soft constraints are prioritized as to the difficulty to which the soft constraints are to be violated.

4. The method of claim 3 wherein:
weighting scale factors are associated in the objective function with constraint violation penalties of respective soft constraint equations and are weighted in accordance with the prioritization of the soft constraints associated with the respective soft constraint equations to make the higher priority soft constraints more difficult to violate.

5. The method of claim 1 wherein:
the objective function comports with the mathematical expression:

$$OBJ = \sum_i w_i \sum_j q_{ij} - \sum_k w_k CVP_k$$

where
OBJ=objective to be optimized;
i=number of fluid components in the fluid;
$w_i$=weighting scale factor for production of the $i^{th}$ fluid in a well bore;
j=the number of well bores:
$q_{ij}$=quantity of the $i^{th}$ produced by the $j^{th}$ well;
k=number of constraint violation penalties associated with the soft constraints;
$w_k$=weighting scale factor for the $k^{th}$ constraint violation penalty; and
$CVP_k$=$k^{th}$ constraint violation penalty.

6. The method of claim 2 wherein:
the objective function comports with the mathematical expression:

$$OBJ = \sum_i w_i \sum_j q_{ij} - \sum_k w_k CVP_k$$

where
OBJ=objective to be optimized;
i=number of fluid components in the fluid:
$w_i$=weighting scale factor for production of the $i^{th}$ fluid in a well bore;
j=the number of well bores;
$q_{ij}$=quantity of the $i^{th}$ component produced by the $j^{th}$ well;
k=number of constraint violation penalties associated with the soft constraints;
$w_k$=weighting scale factor for the $k^{th}$ constraint violation penalty; and
$CVP_k$=$k^{th}$ constraint violation penalty.

7. The method of claim 6 wherein:
the soft constraints are prioritized as to the difficulty to which the soft constraints are to be violated; and
the weighting scale factors $w_k$ associated with the constraint violation penalties $CVP_k$ of the respective soft constraint equations are weighted in accordance with the prioritization of the soft constraints to make the higher priority soft constraints more difficult to violate.

8. The method of claim 1 wherein:
the well bores include a plurality of completion elements and the at least one subterranean reservoir includes a plurality of reservoir elements which are in fluid communication with the completion elements;
the step of simulating fluid flow includes determining pressures in the reservoir elements and in the completion elements and includes determining the corresponding component fluid flow rates in the completion elements due to the pressure draw down between the reservoir elements and the completion elements; and
the component flow rate equations are generated from component rate data points which are created by scaling and summing the component fluid flows in the completion elements of each well bore based upon the component fluid flow rates determined in the simulation of fluid flow and in relation to the changing pressure draw down between the reservoir and completion elements.

9. The method of claim 8 wherein:

the component rate data points are generated utilizing the following mathematical expression:

$$q_{pT}^* = \sum_{i=1}^{n_{comp}} \frac{\Delta P_i - c}{\Delta P_i} q_{pi}$$

where $q_{pT}^*$=new total quantity of flow from a well bore;

$n_{comp}$=number of completion elements in a particular well bore;

$\Delta P_i$=original pressure draw down of the $i^{th}$ completion element;

c=change in pressure draw down from the original simulated pressure draw down for a completion element; and $q_{pi}$=original simulated quantity of component flow from the $i^{th}$ completion element.

10. A method for enhancing the allocation of fluid flow rates among a plurality of well bores in fluid communication with at least one subterranean reservoir, the method comprising:

(a) simulating fluid flow of a fluid containing multiple components in a plurality of well bores and in at least one subterranean reservoir, the well bores including a plurality of completion elements and the at least one subterranean reservoir including a plurality of reservoir elements which are in fluid communication with the completion elements, and determining pressures in the reservoir elements and in the completion elements and determining the corresponding component flow rates in the completion elements due to the pressure draw down between the reservoir elements and the completion elements;

(b) selecting production constraints including at least one hard constraint wherein the at least one hard constraint is observed and at least one soft constraint wherein the at least one soft constraint may be violated;

(c) generating component rate data points for the well bores over a range of fluid flows by scaling the summing component fluid flows in the completion elements based upon component flow rates determined in step (a) and changing pressure draw downs between the reservoir and completion elements;

(d) generating component flow rate equations for the well bores based upon the data points for the respective well bores including comparing characteristics of fluid flow in at least two well bores and if the characteristics are within a predetermined range of one another, then relating the fluid flow rates of the at least two well bores together by generating rate relating equations in the component flow rate equations so that the at least two well bores will have related allocated flow rates;

(e) generating constraint equations corresponding to production constraints including at least one soft constraint equation associated with the at least one soft constraint, the at least one soft constraint equation including a constraint violation penalty (CVP) which allows the at least on soft constraint equation to satisfy the soft constraint;

(f) generating an objective function corresponding to the fluid flow in the well bores;

(g) optimizing the objective function utilizing an optimizer and the constraint and component flow rate equations to determine an enhanced allocation of fluid flow rates among the plurality of well bores wherein the at least one soft constraint may be violated if necessary to achieve a physically deployable solution to the optimization and violating the at least one hard constraint causes the optimization to be physically non-deployable; and (h) allocating the fluid flow rates among the plurality of well bores as determined in step (g) by adjusting well control devices to control fluid flow in the plurality of well bores.

11. The method of claim 10 further comprising:

generating piecewise linear functions from the data points for each of the well bores; and generating the component flow rate equations from the piecewise linear functions.

12. The method of claim 11 wherein:

the component flow rate equations include binary variables to describe the piecewise linear function; and the optimizing step includes using mixed integer programming.

13. The method of claim 10 wherein:

the flow rates of at least two of the well bores are related to one another such that adjusting the flow rate of one of the at least two related well bores influences the flow rates of the other related well bores.

14. The method of claim 10 wherein:

the optimizer utilizes at least one of linear programming and mixed integer programming in optimizing the objective function.

15. The method of claim 14 wherein:

the optimizer utilizes mixed integer programming in optimizing the objective function.

16. The method of claim 10 wherein:

the component rate data points are constructed utilizing the following mathematical expression:

$$q_{pT}^* = \sum_{i=1}^{n_{comp}} \frac{\Delta P_i - c}{\Delta P_i} q_{pi}$$

where $q_{pT}^*$=new total quantity of flow from a well bore;

$n_{comp}$=number of completion elements in a particular well bore;

$\Delta P_i$=original pressure draw down of the $i^{th}$ completion element;

c=change in pressure draw down from the original simulated pressure draw down for a completion element; and $q_{pi}$=original simulated quantity of component flow from the $i^{th}$ completion element.

17. The method of claim 1, wherein in step (b) the at least one soft constraint is selected from a group consisting of producing at least a target level of oil, producing at least a target level al gas, limiting gas production below a predetermined limit, limiting water production below a predetermined limit; limiting water in injection to an amount related to water production; limiting gas injection for providing gas assisted lift to below a predetermined limit; a predetermined gas-to-oil ratio, a predetermined water to oil ratio, and a predetermined water-to-gas ratio.

18. The method of claim 1, wherein the generating system equations including component flow rate equations corresponding to the simulated fluid how in the well bores and constraint equations in step (c) further comprises including at least one hard constraint equation associated with the at least one hard constraint.

19. The method of claim 1, wherein at least one of the well control devices is a choke.

20. The method of claim 1, wherein at least one of the production constraints is time-dependent.

* * * * *